(12) United States Patent
Li (10) Patent No.: US 8,239,257 B2
(45) Date of Patent: Aug. 7, 2012

(54) DISPLAYING ONLINE ADVERTISEMENTS

(75) Inventor: Mu Li, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 239 days.

(21) Appl. No.: 12/601,579

(22) PCT Filed: Jun. 5, 2009

(86) PCT No.: PCT/US2009/046459
§ 371 (c)(1),
(2), (4) Date: Nov. 24, 2009

(87) PCT Pub. No.: WO2009/149380
PCT Pub. Date: Dec. 10, 2009

(65) Prior Publication Data
US 2010/0179873 A1    Jul. 15, 2010

(30) Foreign Application Priority Data
Jun. 5, 2008  (CN) .......................... 2008 1 0110488

(51) Int. Cl.
*G06Q 30/00* (2012.01)
(52) U.S. Cl. ..................................... 705/14.1
(58) Field of Classification Search .................. 705/14.1
See application file for complete search history.

(56) References Cited

U.S. PATENT DOCUMENTS

| | | | |
|---|---|---|---|
| 5,848,397 A | 12/1998 | Marsh et al. | |
| 5,937,037 A * | 8/1999 | Kamel et al. | 379/88.19 |
| 6,009,409 A | 12/1999 | Adler et al. | |
| 6,286,045 B1 | 9/2001 | Griffiths et al. | |
| 6,876,974 B1 | 4/2005 | Marsh et al. | |
| 7,039,932 B2 | 5/2006 | Eldering | |
| 7,536,316 B2 | 5/2009 | Ozer et al. | |
| 2003/0101454 A1 | 5/2003 | Ozer et al. | |
| 2005/0049915 A1 | 3/2005 | Mehta et al. | |
| 2007/0271579 A1 | 11/2007 | Harris et al. | |
| 2008/0052154 A1 | 2/2008 | Gulliksen | |
| 2008/0155590 A1 | 6/2008 | Soukup et al. | |
| 2008/0195470 A1 | 8/2008 | Ferrer | |
| 2008/0249875 A1 | 10/2008 | Lee et al. | |
| 2008/0249986 A1 | 10/2008 | Clarke-Martin et al. | |
| 2009/0265227 A1 | 10/2009 | Langford et al. | |

OTHER PUBLICATIONS

Chinese Office Action mailed Jan. 27, 2011 for Chinese patent application No. 200810110488.8, 4 pages.

* cited by examiner

*Primary Examiner* — Daniel Lastra
(74) *Attorney, Agent, or Firm* — Lee & Hayes, PLLC (57) ABSTRACT

Disclosed is a method for displaying an advertisement. The method displays a present advertisement, determines whether the present advertisement has been displayed completely, and adds an identifier of the present advertisement to a priority advertisement list if the present advertisement has not been displayed completely. The method sends the priority advertisement list to the advertisement engine when requesting the advertisement engine for displaying a next advertisement. Using the priority advertisement list, the advertisement engine may give priority to the present advertisement in next advertisement assignment. Using an optimized advertisement display strategy, the disclosed method may increase coverage rates of advertisement contents to audiences, thereby improving advertisement effectiveness for advertisers and increasing cash flow return for website owners.

21 Claims, 6 Drawing Sheets

DISPLAYING ONLINE ADVERTISEMENTS

RELATED APPLICATIONS

This application is a national stage application of international patent application PCT/US09/46459 filed Jun. 5, 2009, entitled "DISPLAYING ONLINE ADVERTISEMENTS" which claims priority from Chinese patent application, Application No. 200810110488.8, filed Jun. 5, 2008, entitled "METHOD, SYSTEM AND APPARATUS FOR DISPLAYING ADVERTISEMENTS", which applications are hereby incorporated in their entirety by reference.

TECHNICAL FIELD

The present disclosure relates to fields of computer networking technologies, and particularly to methods, apparatuses and systems for displaying advertisements.

BACKGROUND

As electronic commerce enters into a rapid growth period, the size of online advertising market, which is the main source of revenue for most websites, has increased enormously and continues to grow at a very fast pace. In China alone, for example, the online advertisement revenue reached seven billion RMB in 2007. Optimizing strategies for displaying online advertisement may not only increase primary cash flow return for website owners, but also improve advertising effectiveness for advertisers. Along with an explosive increase in the number of websites, particularly medium-sized and small-sized websites, a key factor in the ad placement optimization is how to improve the impression values of the advertisements placed in various positions on various web pages.

Because qualities and contents vary among websites, the time spent by a surfer on browsing different web pages may be very different. If the time spent on a web page by a surfer is too short, an advertisement that is hosted on the web page may not be noticed by the surfer. In comparison, some web pages of better qualities and substantial contents have good web traffics, and therefore can attract a surfer to spend more time browsing the web pages. However, if the surfer sees the same advertisement for this whole period of time, it can still be a loss to both the website owner and the advertiser because of low advertisement effectiveness.

In existing technologies, simple rotational advertising is used to increase profits for website owners. This simple rotational advertising is mechanically oriented at a single web page. Therefore, advertisements seen by a surfer when multiple web pages of a website are opened may belong to the same advertisement group. If the browsing time spent by the surfer is too short, the surfer may only see the first rotated advertisement every time. This may lead to an unbalance in respective frequencies for displaying different advertisements, and easily cause resistance of the surfer. As a result, the rotational advertising has only limited effectiveness.

SUMMARY

The present disclosure provides a method and an apparatus for displaying an advertisement to help timely update advertisement content when displaying advertisements, and improve the coverage of the advertisement content displayed to an audience.

One aspect of the disclosure is a method for displaying an advertisement. The method displays a present advertisement, determines whether the present advertisement has been displayed completely, and adds an identifier of the present advertisement to a priority advertisement list if the present advertisement has not been displayed completely so that the advertisement engine may give priority to the present advertisement in next advertisement assignment. The method sends the priority advertisement list to the advertisement engine, and requests the advertisement engine for displaying a next advertisement.

The method may further delete the identifier of the present advertisement from the priority advertisement list after the present advertisement has been completely displayed. To request the advertisement engine for displaying a next advertisement, the method may further collect browser information, create a display request based on the browser information, send the display request to the advertisement engine, and receive a feedback to the display request from the advertisement engine. The browser information collected may include a recently displayed advertisement list. The method may further record an identifier of the next advertisement.

In one embodiment, the method further adds the identifier of the present advertisement into the recently displayed advertisement list after the present advertisement has been displayed completely.

According to another aspect of the disclosure, a method for displaying an advertisement adds an identifier of a present advertisement to a priority advertisement list so that an advertisement engine may give priority to the present advertisement in next advertisement assignment. The method displays the present advertisement, determines whether the present advertisement has been displayed completely, and deletes the identifier of the present advertisement from the priority advertisement list if the present advertisement has been completely displayed.

Another aspect of the disclosure is an advertisement engine including a receiving module, a computing module and a sending module. The receiving module is adapted for receiving a display request from an advertisement display device. The display request contains a priority advertisement list which is updated by the display device according to a completeness status of a recently displayed advertisement. The computing module is adapted for executing an advertisement display algorithm to determine a feedback according to the display request. The sending module is adapted for sending the feedback to the advertisement display device. The advertisement engine may further have a storage for storing a plurality of advertisements to be displayed by the advertisement display device.

Another aspect of the disclosure is a server computer having a server storage and a server processor, this wherein the server computer is connected to a client through a network, and the server storage has stored thereupon a computer code. When executed, the computer code causes the client to control the following acts: display a present advertisement; determine whether the present advertisement has been displayed completely; add an identifier of the present advertisement to a priority advertisement list if the present advertisement has not been displayed completely; and request an advertisement engine for a next advertisement by sending the priority advertisement list to the advertisement engine. The computer code, when executed, may further cause the client to delete the identifier of the present advertisement from the priority advertisement list after the present advertisement has been completely displayed, and/or add the identifier of the present advertisement into a recently displayed advertisement list after the present advertisement has been displayed completely.

In one embodiment, the computer code comprises a client-side script which is transmitted from the server computer to the client to be executed by the client.

Using an optimized advertisement display strategy, the disclosed method may increase coverage rates of advertisement contents to audiences, thereby improving advertisement effectiveness and increasing cash flow return for website owners.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 6 shows a flow chart illustrating a specific implementation of displaying an advertisement in accordance with the second exemplary embodiment of the present disclosure. In:

DETAILED DESCRIPTION

Exemplary embodiments of the present disclosure are described in further details using accompanying figures and exemplary embodiments.

Figure 1:
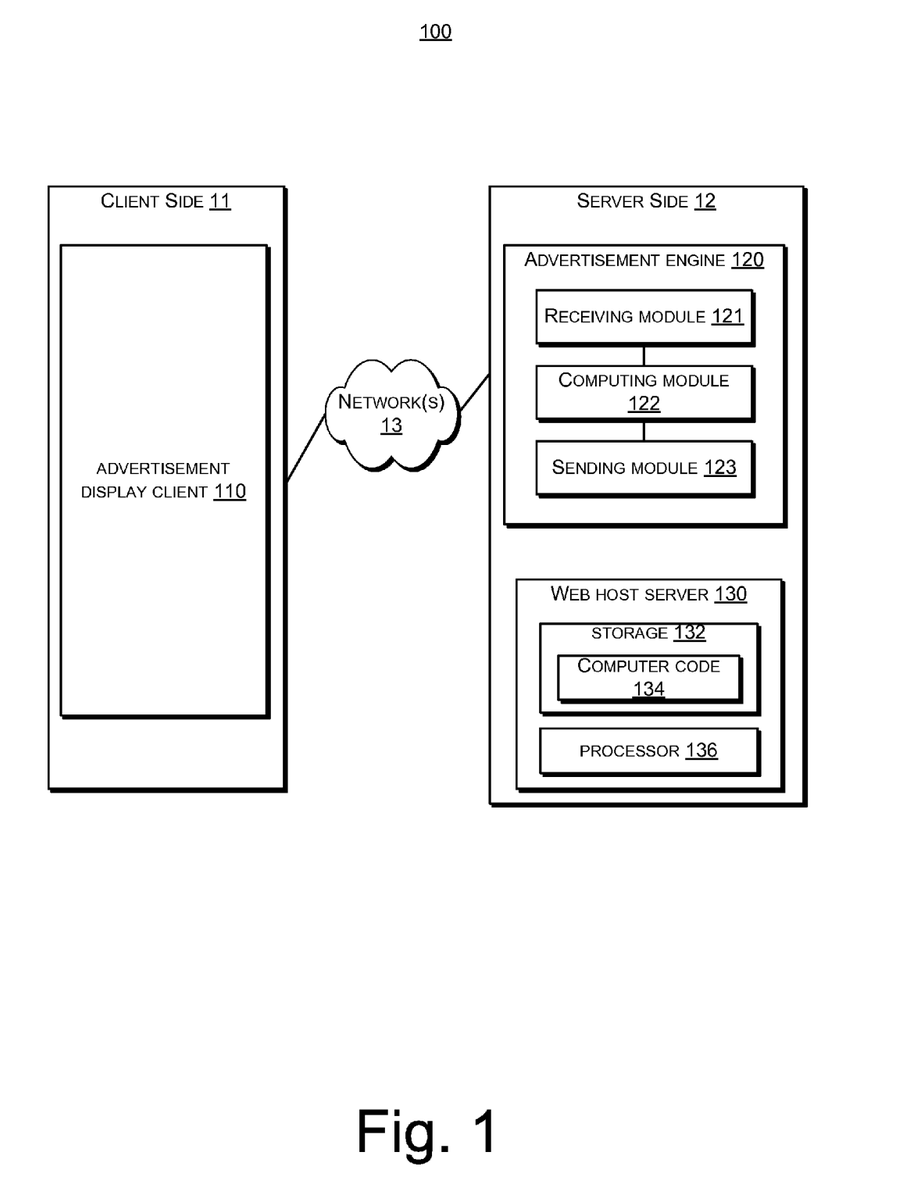
FIG. 1 shows a structural diagram of a system for displaying an advertisement in accordance with a first exemplary embodiment of the present disclosure.

FIG. 1 shows a structural diagram of a system 100 for displaying an advertisement in accordance with the first exemplary embodiment of the present disclosure. The system 100 is divided into a client-side 11 and a server-side 12 which are connected through networks 13 (e.g., the Internet). The client-side 11 includes an advertisement display client 110. The server-side 12 includes an advertisement engine 120 and a web host server 130. The advertisement engine 120 and the web host server 130 may be incorporated in the same server or the same server cluster. Alternatively, the advertisement engine 120 may be a part of the web host server 130.

The advertisement display client 110, which is on client-side 11, is used for displaying a present advertisement, determining display conditions of the present advertisement, and submitting an advertisement display request to an advertisement engine 120 of server-side 12 through network 13. In a typical application, advertisement display client 110 receives advertisements from the advertisement engine 12 when a client-side browser visits a webpage hosted by Web host server 130.

The advertisement display client 110 displays the present advertisement obtained in previous advertisement display request, and determines whether the present advertisement has been completely displayed. If the present advertisement has been displayed completely, the advertisement display client 110 requests the advertisement engine 120 for a next advertisement through the network 13.

The advertisement engine 120 is deployed on the server-side 12 where advertisements are stored. The advertisement engine 120 is used for receiving the display request from the advertisement display client 110 of the client-side 11, executing an advertisement display algorithm, and assigning the next advertisement to the advertisement display client 110.

Upon receiving the advertisement display request from the advertisement display client 110 of the client-side 11, the advertisement engine 120 executes the advertisement display algorithm based on the content of the advertisement display request received, and assigns the next advertisement to the advertisement display client 110 according to the computed result of the advertisement display algorithm.

The advertisement engine 120 includes a receiving module 121, a computing module 122 and a sending module 123, which are discussed in further detail below.

The receiving module 121 is used for receiving the display request from the advertisement display client 110 through the network 13. The display request of the advertisement display client 110 includes a recently displayed advertisement list and a priority advertisement list. The recently displayed advertisement list contains information of the recently displayed advertisements and can be in any suitable data format. Likewise, the priority advertisement list contains information of the advertisements preferred to be displayed, and can be in any data format. These lists are used by the advertisement engine 120.

The computing module 122 is used for executing the advertisement display algorithm upon receiving the display request from the receiving module 121. The computing module 122 feeds the priority advertisement list (preferably with weights assigned to different advertisements in the list) into the advertisement display algorithm to guarantee a certain desired probability of displaying a preferably displayed advertisement. Similarly, the computing module 122 feeds the recent displayed advertisement list into the advertisement display algorithm to suitably reduce the probabilities that these recent displayed advertisements are displayed again in a short period of time.

The algorithm for displaying advertisement is determined by a number of factors, which include present web content, region(s) clicked by a user, type of present website, properties of the browsing user, etc. Browser Information may also be included in the algorithm as one of the influencing factors, and may be optimized continuously using regression to allow its influence to attain an optimum level.

The sending module 123 is used for sending a feedback to the display request to the advertisement display client 110 based on the computed result of the computing module 122. The sending module 123 sends the feedback to the display request to the advertisement display client 110 to complete an advertisement assignment. A feedback of a display request may include information about time duration required for completely displaying an advertisement that is going to be displayed. For video or dynamic advertisement, the time duration required to completely display the advertisement may be the time that needs to be taken for completely playing the present advertisement once. For static advertisements such as image and text, a default time duration may be used.

If a browser visits a website which uses the advertisement engine 120 to provide advertisements for the first time, a display request is sent to the advertisement engine 120. A feedback to this display request may further include an identifier set up by the advertisement engine 120 for this browser. This identifier may stay in the browser, and be used as an identity certificate of the browser. Using this identifier, the advertisement engine 130 may detect it when the browser visits any web page that displays the present advertisement.

The web host server 130 has a server storage 132 and a server processor 136. The web host server is connected to the client side 11 through network 13. The server storage has stored thereupon a computer code 134. When executed, the computer code 134 causes the client-side 11 to perform desired acts, including display a present advertisement; determine whether the present advertisement has been displayed completely; add an identifier of the present advertisement to a priority advertisement list if the present advertisement has not been displayed completely; and request an advertisement engine for a next advertisement by sending the priority advertisement list to the advertisement engine. The computer code 134 may further cause the client-side 11 to delete the identifier of the present advertisement from the priority advertisement list after the present advertisement has been completely displayed, and/or add the identifier of the present advertisement into a recently displayed advertisement list after the present advertisement has been displayed completely.

The computer code 134 may be a client-side script. During a client's visit of a webpage hosted on the web host server 130, the computer code 134 is transmitted from the web host server 130 to the client-side 11 to be executed by the client-side 11. The functionalities of the computer code 134 are thus described below in further detail in the context of being executed by the client-side 11.

Figure 2:
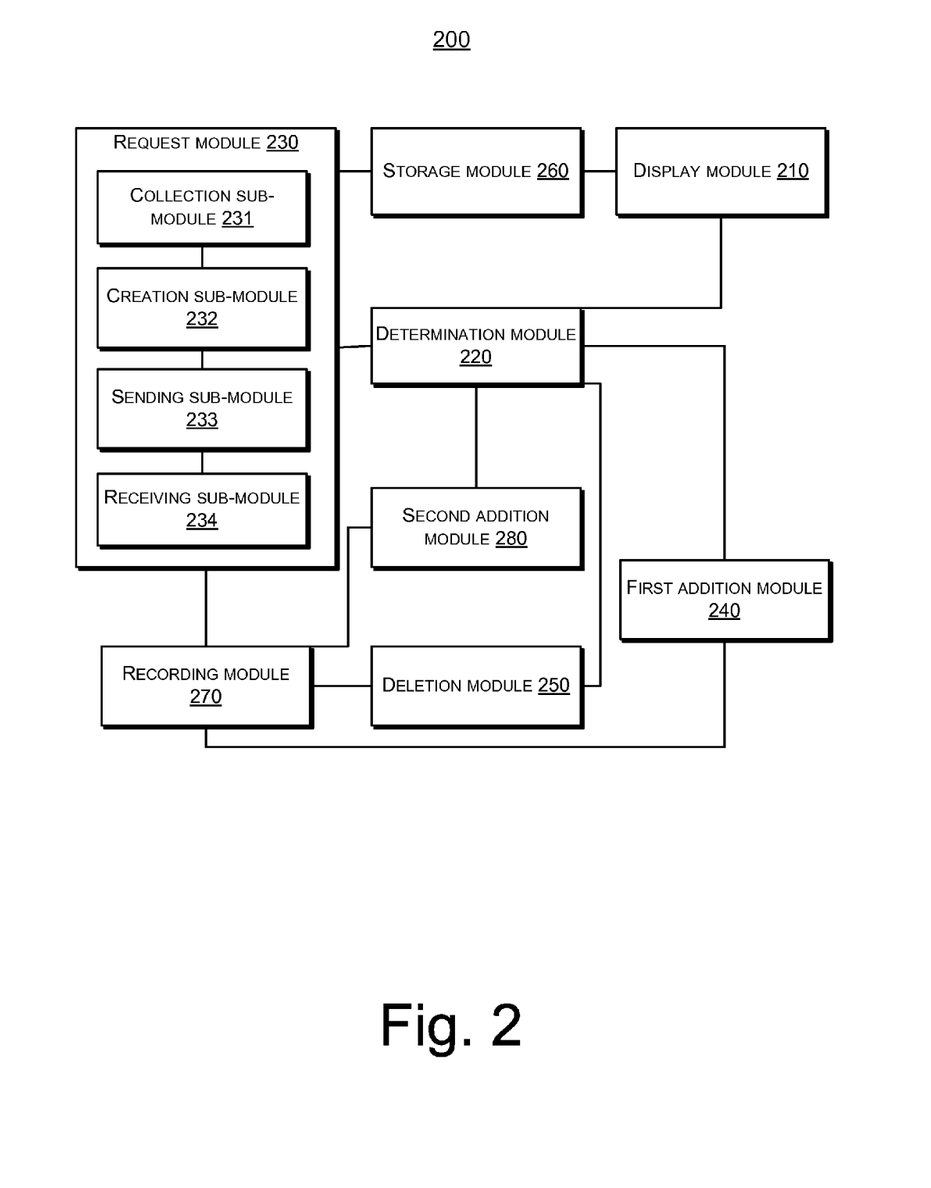
FIG. 2 shows a structural diagram of an apparatus for displaying an advertisement in accordance with the first exemplary embodiment of the present disclosure.

FIG. 2 shows a structural diagram of an apparatus 200 for displaying an advertisement in accordance with the first exemplary embodiment of the present disclosure. The apparatus 200 is an exemplary embodiment of the advertisement display client 110 on the client-side 11. The apparatus 200 includes components described as follows.

A display module 210 is used for displaying a present advertisement. A determination module 220 is used for determining whether the present advertisement has been displayed completely by the display module 210. A request module 230 is used for requesting an advertisement engine (120) for a next advertisement after the determination module 220 has determined that the present advertisement has been displayed completely.

The advertisement engine can be the advertisement engine 120 which is deployed in a server that stores advertisements. Upon receiving an advertisement display request from a client (e.g., advertisement display client 110), the advertisement engine 120 executes an advertisement display algorithm according to the advertisement display request's content received, and assigns an advertisement to the client based on a computed result.

A first addition module 240 is used for adding an identifier of the present advertisement to priority advertisement list after the determination module 220 determines that the present advertisement has not been displayed completely. A deletion module 250 is used for deleting the identifier of the present advertisement from the priority advertisement list after the determination module 220 determines that the present advertisement has been displayed completely. A storage module 260 is used for storing an advertisement requested by the request module 230. A recording module 270 is used for recording an identifier of the advertisement requested by the request module 230.

After the advertisement engine 120 assigns an advertisement to the client (110), the storage module 260 stores the assigned advertisement to allow displaying by the display module 210. The recording module 270 records the advertisement's identifier for use by the first addition module 240, a second addition module 280 and the deletion module 250. Function of the recording module 270 may be implemented using a cookie.

The second addition module 280 is used for adding the identifier of the present advertisement to a recently displayed advertisement list after the determination module 220 determines that the present advertisement has been displayed completely. The request module 230 includes subcomponents described as follows.

A collection sub-module 231 is used for collecting browser information. A creation sub-module 232 is used for creating a display request based on the browser information collected by the collection sub-module 231, wherein the browser information specifically includes a recently displayed advertisement list and priority advertisement list. A sending sub-module 233 is used for sending the display request created by the creation sub-module 232 to the advertisement engine. A receiving sub-module 234 is used for receiving a feedback to the display request returned by the advertisement engine.

In the presence disclosure, a "module" in general refers to a functionality designed to perform a particular task or function. A module can be a piece of hardware, software, a plan or scheme, or a combination thereof, for effectuating a purpose associated with the particular task or function. When a module is a software-based functionality, for example, it may be a program installed on a client machine, an add-on component in a local application program (e.g., browser), or a script embedded in the HTML of a webpage received from a server (e.g., web host server 130).

Figure 3:
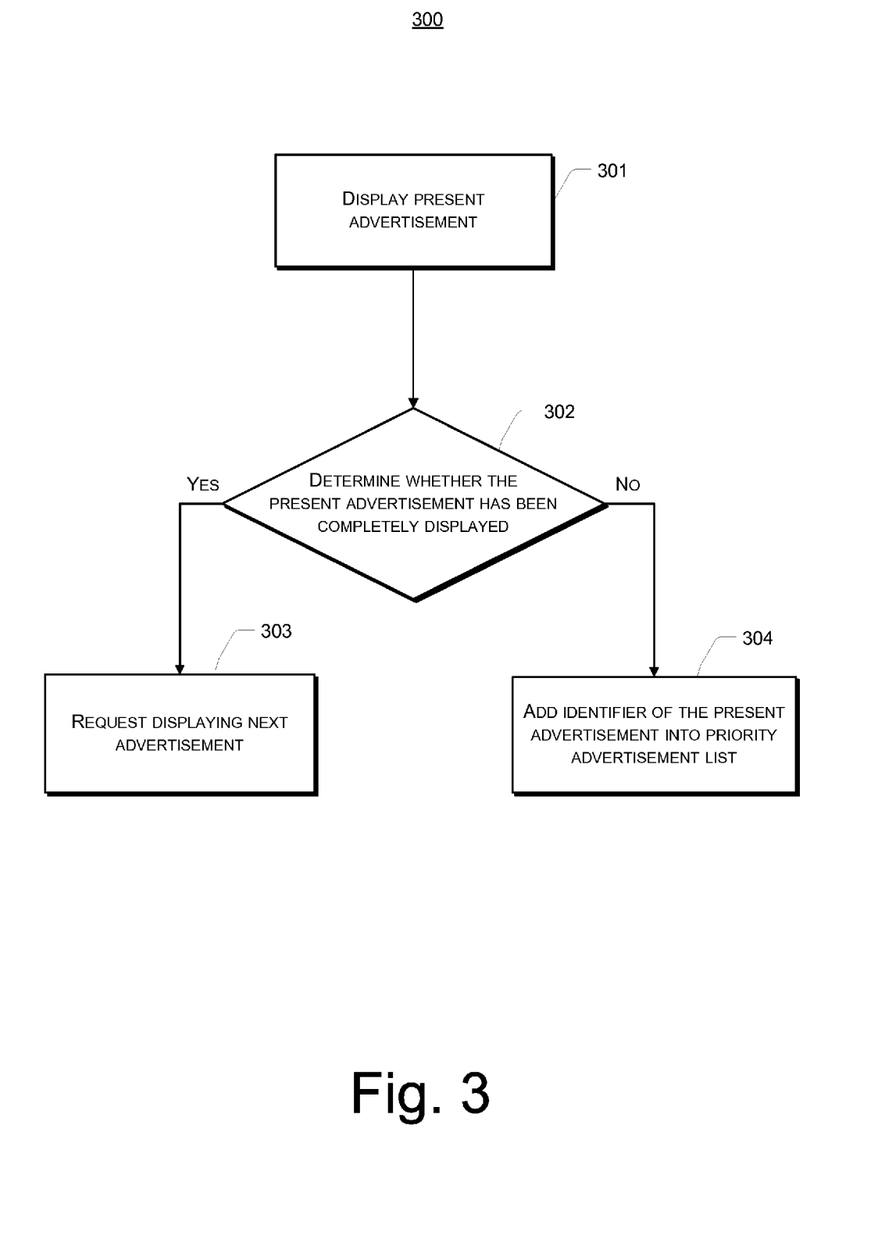
FIG. 3 shows a flow chart of a method for displaying an advertisement in accordance with the first exemplary embodiment of the present disclosure.

FIG. 3 shows a flow chart of a process 300 for displaying an advertisement in accordance with the first exemplary embodiment of the present disclosure. In this description, the order in which a process is described is not intended to be construed as a limitation, and any number of the described process blocks may be combined in any order to implement the method, or an alternate method. The process 300 includes the following procedures described in blocks.

Block 301 displays a present advertisement. A user uses a browser to access a web page having a present advertisement. The browser is a client program used by the user for accessing the web page. The present advertisement is displayed on the web page which is presently accessed by the user through the browser.

Block 302 determines whether the present advertisement has been displayed completely. If the present advertisement has been completely displayed, the process continues to Block 303. Otherwise, the process proceeds to Block 304.

Using a JavaScript statement new Date( ) in the browser, the current time of the user client's operating system is obtained with precision up to one millisecond. If time difference between the current time and the time when the present advertisement starts to be displayed is greater than or equal to time duration for the present advertisement, the present advertisement is determined to have been displayed completely. If time difference between the current time and the time when the present advertisement starts to be displayed is less than the time duration for the present advertisement, the present advertisement is determined to have not been displayed completely.

When requested for the present advertisement, the advertisement engine returns information about time duration required for completely displaying the present advertisement. For video or dynamic advertisement, the time duration for the present advertisement refers to the time taken for completely playing the present advertisement once. With respect to static advertisements such as image and text, a default time duration may be used. The determining operation is executed when the time duration for the present advertisement has elapsed after the requested present advertisement is received, and when the browser closes the web page having the present advertisement.

Block 303 requests the advertisement engine for displaying a next advertisement. In the process of browsing web pages with a browser, the advertisement engine records the time spent in browsing in each page view. For a web page having longer average browsing duration across page views, more advertisements may be requested for reserve from the advertisement engine, and information of the requested advertisements may be stored in the storage module. After the present advertisement has been displayed completely, a next advertisement is displayed, while JavaScript of the web page having advertisements hides the present advertisement.

In cases when there is no reserved advertisement or all the reserved advertisements have already been displayed, Ajax technology may be used to request the advertisement engine for a next advertisement asynchronously. Specifically, without refreshing the present web page, an xmlHttpRequest object, which is installed in all types of browsers, is used to send an http request. When data of the http request is returned, a JavaScript event is triggered, and JavaScript displays the next advertisement.

Block 304 adds an identifier of the present advertisement into priority advertisement list. After receiving the present advertisement from the advertisement engine, an identifier of the present advertisement is recorded. If the browser closes the web page before the present advertisement has been displayed completely, the identifier of the present advertisement is added into priority advertisement list. During subsequent browsing using the browser, the identifier of the present advertisement is fed into the advertisement display algorithm in the form of a priority advertisement list, and is assigned a certain priority weight by the advertisement engine to ensure that the present advertisement is preferably displayed.

The advertisement engine installs a unique identifier in the form of a cookie into any browser that has browsed the web page which displays the present advertisement. The identifier stays in the respective browsers. The identifier acts as an identity certificate of the browser, and is detected by the advertisement engine when the browser accesses any web page that displays the present advertisement.

Figure 4:
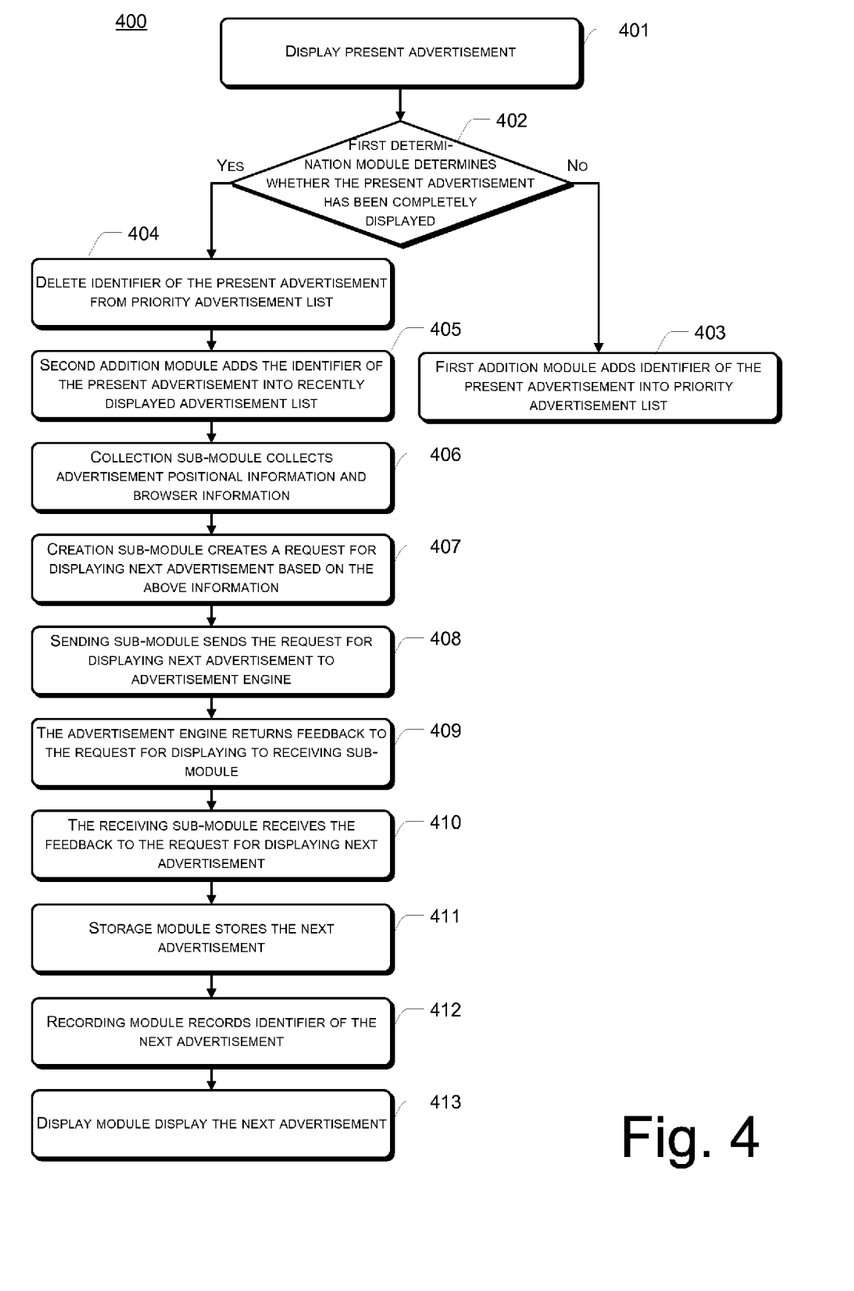
FIG. 4 shows a flow chart illustrating a specific implementation of displaying an advertisement in accordance with the first exemplary embodiment of the present disclosure.

FIG. 4 shows a flow chart illustrating a process 400 of displaying an advertisement in accordance with the first exemplary embodiment of the present disclosure. The process 400 includes procedures described as follows.

At Block 401, the display module 210 displays a present advertisement.

At Block 402, the determination module 250 determines whether the present advertisement has been completely displayed. If the present advertisement has been displayed completely, the process proceeds to Block 404. Otherwise, the process continues to Block 403.

At Block 403, the first addition module 240 adds an identifier of the present advertisement into priority advertisement list.

When a browser closes the present web page, a cookie operation is performed, and an identifier of the present advertisement is added into priority advertisement list if the present advertisement has not been displayed completely. The cookie action is written in an onunload event of a window object of an iframe which has the advertisement. The onunload event is defined in standard built-in events in HTML 4.01 standard of W3C (World Wide Web Consortium), and is triggered when a user changes the present web page or a file in the frame. All mainstream browsers provide support for this event.

At Block 404, the deletion module 250 deletes the identifier of the present advertisement from the priority advertisement list.

At Block 405, the second addition module 280 adds the identifier of the present advertisement into a recently displayed advertisement list.

After the present advertisement has been completely displayed, a cookie operation is performed. The deletion module 250 deletes the identifier of the present advertisement from the priority advertisement list, while the second addition module 280 adds the identifier of the present advertisement into a recently displayed advertisement list.

At Block 406, the collection sub-module 231 collects advertisement positional information and browser information. Browser information may include browser's identifier, a recently displayed advertisement list, and priority advertisement list.

At Block 407, the creation sub-module 232 creates a request for displaying advertisement based on the above-described information. The recently displayed advertisement list and the priority advertisement list are recorded in the cookies of the browser, and are automatically included in a Header file of an http request created by the creation sub-module for displaying next advertisement. The recently displayed advertisement list and the priority advertisement list are used by the advertisement engine in subsequent procedures.

At Block 408, the sending sub-module 233 sends the request for displaying next advertisement to the advertisement engine.

At Block 409, the advertisement engine 120 returns a feedback of the request for displaying next advertisement to the receiving sub-module. The advertisement engine 120 adds the priority advertisement list into the advertisement display algorithm, and assigns with a weight to ensure that the preferably displayed advertisements have a certain probability of being displayed. Similarly, the advertisement engine 120 adds the recently displayed advertisement list into the advertisement display algorithm to suitably reduce the probability of displaying these advertisements in a short period of time.

The algorithm for displaying advertisement is determined by a number of factors, which include present web content, region(s) clicked by a user, type of present website, properties of the browsing user, etc. Browser Information may also be included in the algorithm as one of the influencing factors, and may be continuously optimized using regression to allow its influence to attain an optimum level.

A feedback to a display request includes information about time duration required for completely displaying an advertisement that is going to be displayed. If a browser visits a website for the first time which uses the advertisement engine 120 to provide advertisements, a display request is sent to the advertisement engine 120. A feedback to this display request may then further include an identifier set up by the advertisement engine 120 for the browser. This identifier stays in the browser, and is used as an identity certificate of the browser.

At Block 410, the receiving sub-module 234 receives the feedback of the request for displaying next advertisement from the advertisement engine.

At Block 411, the storage module 260 stores the next advertisement.

At Block 412, the recording module 270 records an identifier of the next advertisement. The recording module 270 records the identifier of the requested advertisement for use in subsequent blocks. The identifier of the advertisement may be added into the browser information or be deleted from the browser information.

At Block 413, the display module 210 displays the next advertisement. The display module 210 displays the requested advertisement, and subsequently starts to determine whether the advertisement has been completely displayed. The process then executes the above-described blocks accordingly.

Figure 5:
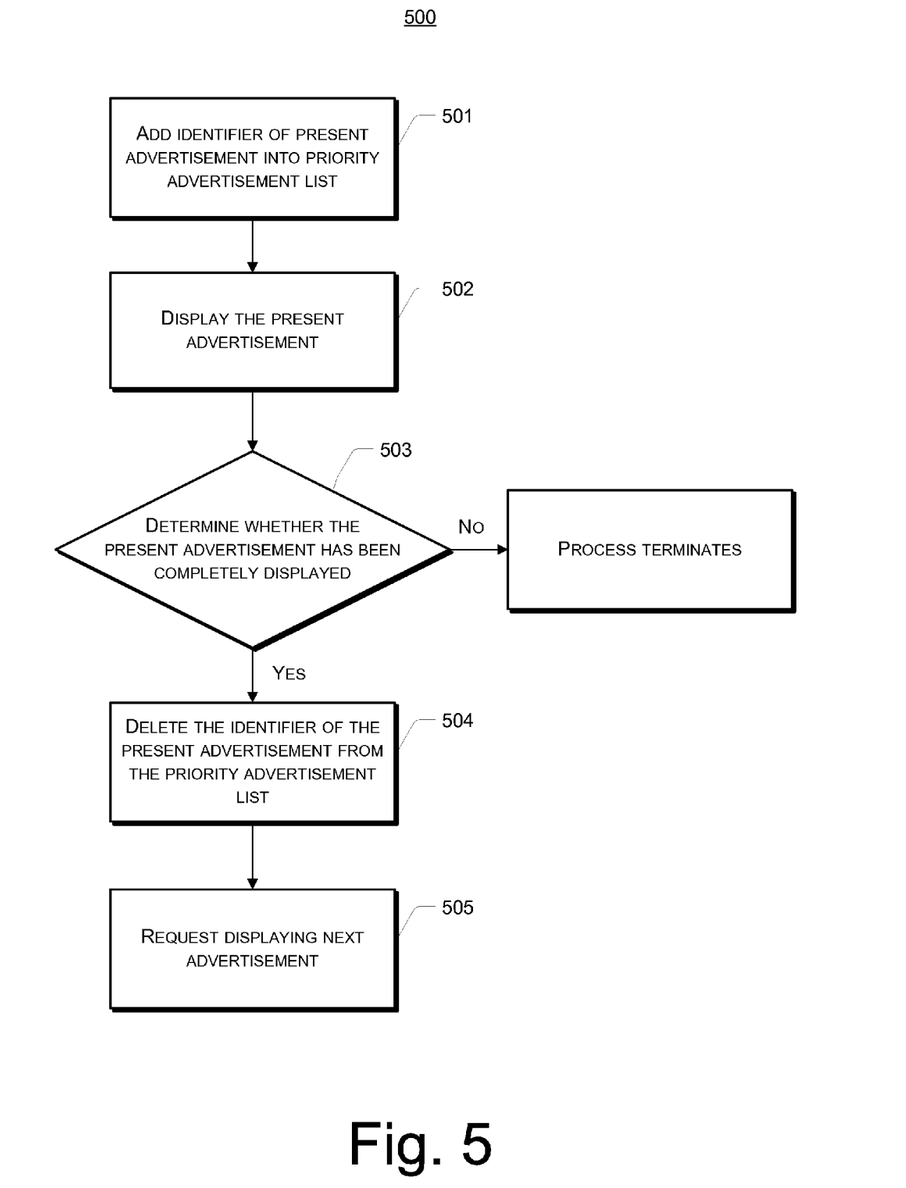
FIG. 5 shows a flow chart of a method for displaying an advertisement in accordance with the second exemplary embodiment of the present disclosure.

FIG. 5 shows a flow chart of a process 500 of displaying an advertisement in accordance with the second exemplary embodiment of the present disclosure. The method may use a system similar to that described in the first exemplary embodiment. The process 500 includes procedures described as follows.

Block 501 adds an identifier of a present advertisement into priority advertisement list. After receiving a present advertisement from the advertisement engine, an identifier of the present advertisement is recorded. If a browser closes a web page having the present advertisement while the present advertisement has not been displayed completely, the identifier of the present advertisement will be added into priority advertisement list. During subsequent browsing using the browser, the identifier of the present advertisement will be added into the advertisement display algorithm in the form of the priority advertisement list, and is assigned a weight by the advertisement engine to ensure that the present advertisement is preferably displayed.

For any browser that has browsed the web page displaying the present advertisement, the advertisement engine will install a unique identifier in the form of a cookie into respective browsers perpetually. The identifier acts as an identity certificate of the browser, and is detected by the advertisement engine when the browser accesses any web page that displays the present advertisement.

Block 502 displays the present advertisement. A user uses the browser to access the web page having the present advertisement. The browser is a client program used by the user for accessing the web page. The present advertisement is displayed on the web page which is presently accessed by the user using the browser.

Block 503 determines whether the present advertisement has been displayed completely. If the present advertisement has been completely displayed, the process continues to Block 504. Otherwise, the process is terminated.

Using a JavaScript statement new Date( ) in the browser, the current time of the user client's operating system is obtained with precision up to one millisecond. When requested for the present advertisement, the advertisement engine returns information about time duration required for completely displaying the present advertisement. The determining operation is executed when the time duration of the present advertisement has elapsed since the requested present advertisement is received, and when the browser closes the web page having the present advertisement. When the browser closes the web page, the present advertisement will be closed, causing an incomplete display of the present advertisement. Because the identifier of the present advertisement has been added into the priority advertisement list before displaying the present advertisement, the advertisement engine will give priority to the present advertisement next time when the advertisement engine assigns advertisement to the browser.

Block 504 deletes the identifier of the present advertisement from the priority advertisement list.

Block 505 requests the advertisement engine for displaying a next advertisement.

As the browser browses web pages, the advertisement engine records the time spent in browsing in each page view. For a web page having longer average browsing duration across page views, more advertisements may be requested from the advertisement engine for reserve. Information of the requested advertisements may be stored in a storage module. After the present advertisement has been displayed completely, a next advertisement is displayed while JavaScript of the web page hides the present advertisement.

In cases when there is no reserved advertisement or all the reserved advertisements have already been displayed, Ajax technology may be used to request the advertisement engine for a next advertisement asynchronously. Specifically, without refreshing the present web page, an xmlHttpRequest object, which is installed in all types of browsers, is used to send an http request. When data of the http request is returned, a JavaScript event is triggered, and JavaScript displays the next advertisement.

Figure 6:
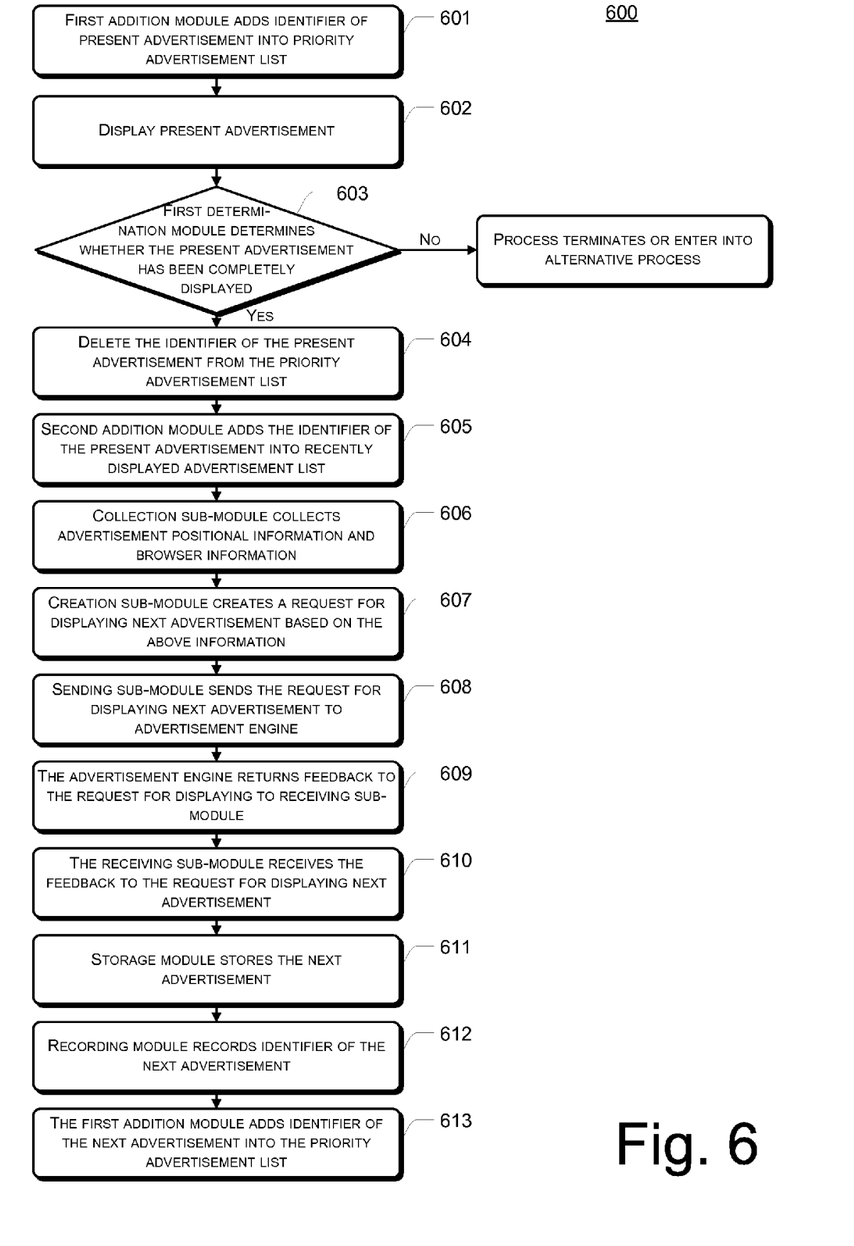

FIG. 6 shows a flow chart illustrating a process 600 of displaying an advertisement in accordance with the second exemplary embodiment of the present disclosure. The implementation may use the system of the first exemplary embodiment described in FIGS. 1-2. The process 600 is described as follows.

At Block 601, the first addition module 240 adds an identifier of a present advertisement into priority advertisement list. Upon receiving a present advertisement from the advertisement engine, a cookie operation is performed, and an identifier of the present advertisement is added into priority advertisement list. The cookie action is written in an onunload event of a window object of an frame which has the advertisement.

At Block 602, the display module 210 displays the present advertisement.

At Block 603, the determination module 220 determines whether the present advertisement has been completely displayed. If the present advertisement has been displayed completely, the process proceeds to Block 604. Otherwise, the process is terminated.

In an event of incomplete display, because the identifier of the present advertisement has been added into the priority advertisement list before displaying the present advertisement, the advertisement engine will give priority to the present advertisement next time when the advertisement engine assigns advertisement to the browser.

At Block 604, the deletion module 250 deletes the identifier of the present advertisement from the priority advertisement list.

At Block 605, the second addition module 280 adds the identifier of the present advertisement into a recently displayed advertisement list.

After the present advertisement has been completely displayed, a cookie operation is performed. The deletion module 250 deletes the identifier of the present advertisement from the priority advertisement list, while the second addition module 280 adds the identifier of the present advertisement into a recently displayed advertisement list.

At Block 606, the collection sub-module 231 collects advertisement positional information and browser information. Browser information may include browser's identifier, a recently displayed advertisement list, and priority advertisement list.

At Block 607, the creation sub-module 232 creates a request for displaying advertisement based on the information above.

The recently displayed advertisement list and the priority advertisement list are recorded in the cookies of the browser, and are automatically included in a Header file of the http request for displaying next advertisement. The recently displayed advertisement list and the priority advertisement list are used by the advertisement engine 120 in subsequent procedures.

At Block 608, the sending module sends the request for displaying next advertisement to the advertisement engine 120.

At Block 609, the advertisement engine 120 returns a feedback of the request for displaying next advertisement to the receiving sub-module.

The advertisement engine 120 feeds the priority advertisement list into the advertisement display algorithm, and assigns with a weight to ensure that the preferably displayed advertisements have a certain probability of being displayed. Similarly, the advertisement engine feeds the recently displayed advertisement list into the advertisement display algorithm to suitably reduce the probability of displaying these advertisements again in a short period of time. The algorithm for displaying advertisement described in the first exemplary embodiment may be used in a second exemplary embodiment.

A feedback to a display request includes information about time duration required for completely displaying an advertisement that is going to be displayed. If a browser visits for the first time a website which uses the advertisement engine 120 to provide advertisements, a feedback to this display request may further include an identifier set up by the advertisement engine 120 for the browser. This identifier stays in the browser, and is used as an identity certificate of the browser.

At Block 610, the receiving sub-module 234 receives the feedback of the request for displaying next advertisement from the advertisement engine.

At Block 611, the storage module 260 stores the next advertisement.

At Block 612, the recording module 270 records an identifier of the next advertisement. The recording module 270 records the identifier of the requested advertisement for use in subsequent blocks. The identifier of the advertisement may be added into the browser information or be deleted from the browser information.

At Block 613, the first addition module 240 adds the identifier of the next advertisement into the priority advertisement list. The first addition module 240 adds the identifier of the next advertisement into the priority advertisement list, and the next advertisement then starts to be displayed. The process will then execute the above-described blocks accordingly.

The technical schemes of the exemplary embodiments of the present disclosure potentially have the following advantages. By optimizing advertisement display, the disclosed method and apparatus can help advertisers to advertise their products to larger audiences, thereby improving advertising effectiveness for advertisers and increasing cash flow return for website owners.

From the exemplary embodiments described above, a technician in the art may readily understand that the disclosed method and system may be implemented using software and general-purpose hardware platform, or can be implemented using hardware only. However, in many instances, implementation using a combination of software and hardware is preferred. Based on this understanding, the technical scheme of the present disclosure, or portions contributing to existing technologies, may be implemented in the form of software products which are stored in a storage media. The software includes instructions for a computing device (e.g., cell phone, personal computer, server or networked device) to execute the method described in the exemplary embodiments of the current disclosure.

It is appreciated that the potential benefits and advantages discussed herein are not to be construed as a limitation or restriction to the scope of the appended claims. Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for displaying an advertisement, the method comprising:
    displaying, at a client side device, a present advertisement;
    determining, at the client side device, whether the present advertisement has been displayed completely;
    adding an identifier of the present advertisement to a priority advertisement list if the present advertisement has not been displayed completely so that an advertisement engine may give priority to the present advertisement in a next advertisement assignment; and
    sending, from the client side device, a display request having the priority advertisement list to the advertisement engine, the display request being a request for a next advertisement to be displayed at the client side device.

2. The method as recited in claim 1, further comprising:
    deleting, at the client side device, the identifier of the present advertisement from the priority advertisement list after the present advertisement has been completely displayed and prior to sending the display request.

3. The method for displaying an advertisement as recited in claim 1 further comprising:
    prior to the sending, from the client side device, a display request, collecting, at the client side device, web-browser information, and
    creating, at the client side device, the display request based on the web-browser information; and
    receiving, at the client side device, a feedback to the display request from the advertisement engine.

4. The method as recited in claim 3, wherein the web-browser information includes a recently displayed advertisement list.

5. The method as recited in claim 1, further comprising:
    recording, at the client side device, an identifier of the next advertisement.

6. The method as recited in claim 1, further comprising:
    adding, at the client side device, the identifier of the present advertisement into a recently displayed advertisement list after the present advertisement has been displayed completely.

7. The method as recited in claim 1, wherein the determining, at the client display device, whether the present advertisement has been displayed completely further comprises:
    determining a starting time for beginning the displaying of the present advertisement;
    determining a current time;

determining a time difference between the current time and the starting time; and determining that the present advertisement has been completely displayed if the time difference is greater than a presentation time for the present advertisement and that the present advertisement has not been completely displayed if the time difference is less than the presentation time for the present advertisement.

8. The method as recited in claim 7, further comprising: receiving the presentation time from the advertisement engine.

9. The method as recited in claim 1, wherein the displaying, at the client display device, the present advertisement at the client display device comprises displaying the present advertisement in a browser window; and wherein the determining, at the client display device, whether the present advertisement has been displayed completely further comprises:

closing the browser window having the present advertisement displayed therein is closed, wherein the determination is performed after the browser window is closed.

10. The method as recited in claim 1, further comprising: employing a web-browser to display the present advertisement;

adding the identifier to a recently displayed list after the present advertisement has been displayed completely; and recording the priority advertisement list and the recently played list in at least one cookie of the web-browser.

11. A method for displaying an advertisement, the method comprising:

adding, at a client side device, an identifier of a present advertisement to a priority advertisement list so that an advertisement engine may give priority to the present advertisement in next advertisement assignment;

displaying, at a client side device, the present advertisement;

determining, at a client side device, whether the present advertisement has been displayed completely, and deleting the identifier of the present advertisement from the priority advertisement list if the present advertisement has been completely displayed; and requesting, at a client side device, the advertisement engine for displaying a next advertisement.

12. The method as recited in claim 11, further comprising: recording, at a client side device, an identifier of the next advertisement.

13. The method as recited in claim 11, wherein requesting the advertisement engine for displaying a next advertisement comprises:

collecting, at a client side device, web-browser information;

creating, at a client side device, a display request based on the browser information;

sending the display request to the advertisement engine; and receiving a feedback to the display request from the advertisement engine.

14. The method as recited in claim 13, wherein the web-browser information comprises:

a recently displayed advertisement list.

15. The method as recited in claim 14, further comprising: adding, at a client side device, the identifier of the present advertisement into the recently displayed advertisement list after the present advertisement has been displayed completely.

16. A server, comprising:

a processor; and at least one storage device having instructions stored therein, the instructions, when executed by the processor, comprising:

a receiving module adapted for receiving a display request from an advertisement display device of a client side device, the display request containing a priority advertisement list which is updated by the advertisement display device of the client side device according to a completeness status of a recently displayed advertisement;

a computing module adapted for executing an advertisement display algorithm to determine a feedback for the advertisement display device of the client side device according to the display request; and a sending module adapted for sending the feedback to the advertisement display device of the client side device.

17. The server as recited in claim 16, wherein the at least one storage device stores a plurality of advertisements to be displayed by the advertisement display device.

18. A server computer system connected to a client side device through a network, comprising:

a server storage and a server processor, the server storage has stored thereupon server-instructions and a client-computer code, the server-instructions, which, when executed by the server processor, causes the server processor to transmit the client-computer code to the client, the client-computer code which, when executed, causes the client side device to perform the following acts:

displaying a present advertisement;

determining whether the present advertisement has been displayed completely;

adding an identifier of the present advertisement to a priority advertisement list if the present advertisement has not been displayed completely; and requesting an advertisement engine for a next advertisement by sending the priority advertisement list to the advertisement engine.

19. The server computer as recited in claim 18, wherein the computer code, when executed, causes the client side device to further perform the following act:

deleting the identifier of the present advertisement from the priority advertisement list after the present advertisement has been completely displayed.

20. The server computer as recited in claim 18, wherein the computer code comprises a client-side script which is transmitted from the server computer to the client side device to be executed by the client.

21. The server computer as recited in claim 18, wherein the computer code, when executed, causes the client side device to further perform the following act:

adding the identifier of the present advertisement into a recently displayed advertisement list after the present advertisement has been displayed completely.

* * * * *